April 30, 1968     J. BILTON     3,380,319
TWO-SPEED GEARS
Filed Oct. 20, 1965
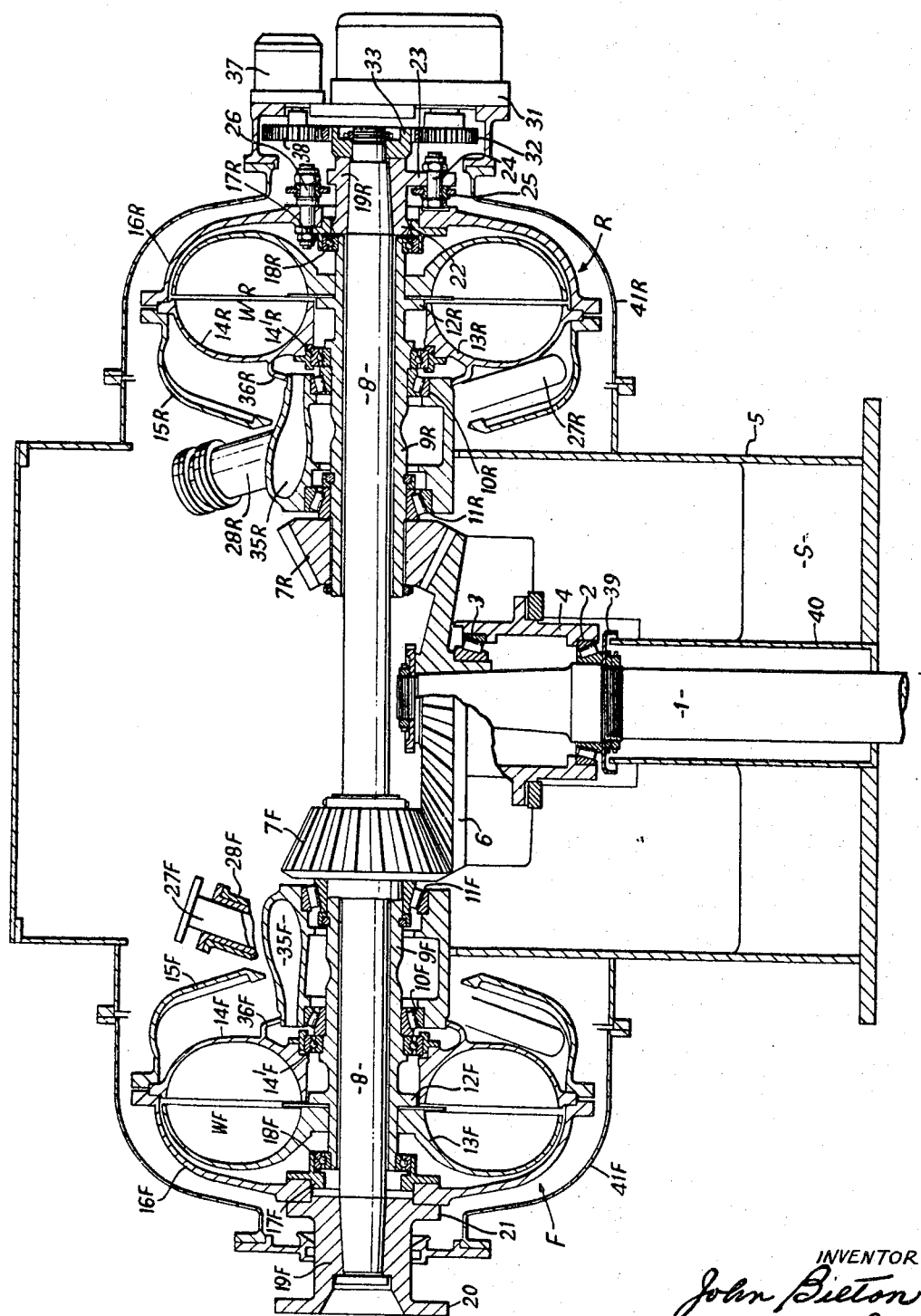
INVENTOR
John Bilton
BY Kenyon Kenyon
Stewart & Estabrook
ATTORNEYS United States Patent Office 3,380,319
Patented Apr. 30, 1968

3,380,319
TWO-SPEED GEARS
John Bilton, Hampton, England, assignor to Fluidrive Engineering Company Limited, Isleworth, Middlesex, England
Filed Oct. 20, 1965, Ser. No. 498,879
Claims priority, application Great Britain, Sept. 7, 1965, 38,224/65
2 Claims. (Cl. 74—718)

ABSTRACT OF THE DISCLOSURE

In a forward and reverse gear comprising an output bevel gear wheel in which mesh two diametrically opposed bevel pinions, each bevel pinion is mounted on a hollow shaft supported in bearings in a support structure and the outer end of each hollow shaft carries a controllable slip coupling, by its output member, the input members of the controllable slip couplings being fixed to an input driving shaft for the forward and reverse gear.

---

This invention relates to two-speed gears.

An object of the invention is to provide a two-speed gear (which may be a forward and reverse gear) in which the mechanism for changing from one speed to the other is readily accessible for maintenance or repair and in which the entire gear is supported in a single compact structure thereby avoiding flexing of the gear, for example when mounted in a ship.

A two-speed gear according to the present invention comprises a first drive shaft rotatably mounted in bearings in a support structure coaxial first and second gearwheels rotatably mounted by means of hollow shafts in the support structure, each of the first and second gearwheels meshing with a gearwheel mounted on the said first shaft for rotation therewith, a second drive shaft extending through the hollow shafts and first and second controllable slip couplings at the outer ends of the two hollow shafts for selectively coupling the respective hollow shaft to the said second drive shaft, the second shaft being preferably supported in bearings in the hollow shafts.

This arrangement is particularly suitable in a forward and reverse gear in which the axis of the said first shaft (which may form the output shaft) is perpendicular to the common axis of the other shafts. The first and second gearwheels may then be bevel gearwheels and mesh with the same gearwheel on the first shaft (to give the same ratio in forward and reverse) or with different bevel gearwheels in the first shaft (for example to give a forward ratio which is higher than the reverse ratio).

The controllable slip couplings may be friction clutches, electromagnetic couplings or controllable-filling hydraulic turbo-couplings comprising vaned impeller and runner elements which together define a toroidal working circuit for liquid such as oil. Where the first shaft forms the output shaft, the runners or driven elements of the couplings are mounted on the hollow shafts and their driving or impeller elements are connected to the input (second) shaft and are conveniently supported in bearings in the driven or runner elements so as to support and locate the input shaft.

An embodiment of the invention will now be described by way of example with reference to the accompanying drawing, in which the single figure is a longitudinal sectional view of a forward and reverse gear forming part of the drive to a transverse propulsion unit mounted in the bow of a ship to assist manoeuvring the ship when docking for example.

The forward and reverse gear shown in the drawing has a first shaft 1 mounted and located by tapered roller bearings 2 and 3 in a tube 4 forming part of a fabricated single pedestal casing 5 for the gear.

The upper end of the shaft 1 carries a spiral bevel gear 6 which meshes with diametrically opposed forward and reverse pinions 7F and 7R which can be selectively coupled to an input shaft 8 by scoop-controlled hydraulic turbo-couplings F and R respectively. Corresponding parts of the two couplings F and R are indicated by the same reference numeral in the drawing with the addition of the letter F or R.

Each pinion 7 is fixed to a hollow shaft 9 which is mounted and located in the casing 5 by tapered roller bearings 10 and 11. Bolted to a flange 12 on the hollow shaft 9 is a vaned runner 13 which with a correspondingly vaned impeller 14 defines the toroidal working circuit of the coupling.

Each impeller 14 is partly supported at its inner portion by a ball bearing 14' on the hollow shaft 9. The rim of each impeller 14 is clamped between a scoop chamber 15 and a casing 16 the hub 17 of which is supported by means of a ball bearing 18 on the outer end of the hollow shaft 9.

The input shaft 8 extends over the whole length of the gear and carries driving bosses 19F and 19R at each end. The boss 19F carries a driving flange 20 by means of which the shaft 8 can be coupled to an electric motor (not shown). At the other end of the boss 19F is a further flange 21 which is bolted to the impeller casing 16F and to the hub 17F. Thus the assembly of the impeller casing 16F, scoop chambers 15F and impeller 14F is supported by the bearings 14'F and 18F on the shaft 9F and the left-hand end of the shaft 8 is secured to this assembly.

The boss 19R is formed with a rounded annular locating bead 22 which fits snugly in a bore in the hub 17R. The boss 19R is also formed with three radially extending fingers 23 spaced at intervals of 120° about the axis of the boss 19R. The fingers 23 are bolted at 24 to a flexible ring 25 which is in turn secured by bolts 26 located half-way between the bolts 24 to the impeller casing 16R. Thus any misalignment of the axes of the shaft 8 and the hollow shaft 9R and relative thermal expansion of the shaft 8 are accommodated without straining any of the components apart from the flexible ring 25.

A longitudinally slidable scoop tube 27 extends through a scoop-tube housing 28 into the scoop chambers 15. Each scoop tube is formed with a scoop orifice which trims off liquid from the scoop chamber 15. Thus the quantity of liquid in the working circuit of each coupling is controlled by the longitudinal position of the scoop tube 27. Liquid from the scoop tubes 27 is discharged (through a cooler if desired) into sumps which may conveniently be formed in the lower part of the casing 5. From the sump, the liquid is returned at a constant rate to both couplings by a pump 31 driven by spur gearing 32, 33 from the extreme right-hand end of the shaft 8. The pump 31 delivers liquid to passages 35 in each coupling which deliver it to an annular trough 36 integral with the impeller 14. Holes (not shown) connect the trough 36 with the interior of the working circuit.

A lubrication pump 37 is driven from the gear 33 by a further gear 38 and delivers lubricating oil to the bearings such as 2 and 3. A thrower shield 39 prevents oil escaping from the bearing 2 from passing between the shaft 1 and a stationary tube 40 surrounding it.

Each coupling is enclosed within a casing 41 which needs to be only of light construction since it does not have to bear any of the weight of the coupling, but only of the pumps 31 and 37 in the case of the casing 41R.

The scoops 27 may be moved manually or by a servo- or remote-control mechanism.

In operation, the electric motor is started up with the working circuits WF and WR both empty of oil, that is with the scoops 27F and 27R both in the positions shown in the drawing. When it is required to rotate the shaft 1 in either the forward or the reverse direction, the appropriate scoop tube 27F or 27R is moved outwards (upwards in the drawing) thus allowing its associated working circuit to fill. If it is desired to reverse the direction of rotation of the shaft 1, the scoop tube is returned to its lowermost position thereby emptying its associated working circuit of liquid and the other working circuit is then allowed to fill by raising its associated scoop tube.

The casing 5 forms a single central pedestal supporting the entire gear. Thus when the gear is used on board ship for example, the flexing of the ship's structure is not transmitted to the gear components as would occur if the couplings F and R were supported directly on the ship's structure through separate pedestals or a supporting framework extending the full length of the gear.

I claim:
1. A forward and reverse gear comprising:
   a pedestal support structure having opposed end portions;
   a first shaft mounted in bearings in said support structure;
   first and second hollow sleeve members mounted in bearings in said end portions one on each side of the axis of said first shaft, said sleeve members having a common axis and having their axially outer end portions projecting from said support structure;
   first and second bevel pinions secured to said sleeve members adjacent their axially inner ends;
   a bevel crown wheel meshing with both said pinions, said crown wheel being secured to said first shaft, said support structure end portions lying adjacent said bevel pinions;
   a second shaft extending through said sleeve members; and,
   first and second controllable slip couplings mounted on said outer ends of said first and second sleeve members respectively, for selectively connecting said second shaft to either of said sleeve members, said first coupling interconnecting said first sleeve member and said second shaft and said second coupling interconnecting said second sleeve member and said second shaft, said couplings supporting said second shaft in said sleeves.

2. A forward and reverse gear according to claim 1 in which said support structure defines an annular sump surrounding said first shaft, and said couplings are scoop-trimmed hydraulic turbo-couplings, each said turbo-coupling comprising:
   vaned impeller and runner elements together defining a toroidal working circuit for liquid, a scoop chamber mounted for rotation with said impeller element, and an adjustable scoop tube extending into said scoop chamber to trim off liquid therefrom and pass it to said sump, each said runner being secured to the respective sleeve member at said projecting end portion, each said impeller and scoop chamber being supported on said projecting end portion through bearings, said forward and reverse gear including a pump drivably coupled to said second shaft and adapted to transfer liquid from said sump to said working circuits of said couplings.

References Cited

UNITED STATES PATENTS

| | | | |
|---|---|---|---|
| 1,757,827 | 5/1930 | Bauer et al. | 74—732 X |
| 2,029,981 | 2/1936 | Black | 74—732 X |
| 2,141,940 | 12/1938 | Sinclair | 74—730 X |
| 2,294,185 | 8/1942 | Kiep et al. | 74—732 |
| 2,345,733 | 4/1944 | Day | 74—732 X |
| 2,890,599 | 6/1959 | Sinclair | 74—732 X |

FOREIGN PATENTS

| | | |
|---|---|---|
| 147,215 | 10/1936 | Austria. |
| 1,148,647 | 6/1957 | France. |
| 474,790 | 11/1937 | Great Britain. |

DONLEY J. STOCKING, *Primary Examiner.*

THOMAS C. PERRY, *Examiner.*